(12) United States Patent
Takeda et al.

(10) Patent No.: US 7,700,198 B2
(45) Date of Patent: Apr. 20, 2010

(54) DISSIMILAR MATERIAL WELD JOINT FORMED BY JOINING IRON TYPE MATERIAL AND ALUMINUM TYPE MATERIAL, AND WELD JOINING METHOD

(75) Inventors: Mikako Takeda, Kobe (JP); Katsushi Matsumoto, Kobe (JP); Masao Kinefuchi, Kobe (JP); Tomokazu Nakagawa, Kobe (JP); Koji Fukumoto, Kobe (JP); Hiroyuki Takeda, Kobe (JP); Yasuo Murai, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 1333 days.

(21) Appl. No.: 11/147,241

(22) Filed: Jun. 8, 2005

(65) Prior Publication Data

US 2005/0274776 A1   Dec. 15, 2005

(30) Foreign Application Priority Data

Jun. 11, 2004 (JP) ............................ 2004-174348
Nov. 5, 2004 (JP) ............................ 2004-322067
Feb. 18, 2005 (JP) ............................ 2005-041883

(51) Int. Cl.
*B23K 35/24* (2006.01)
*B23K 1/19* (2006.01)

(52) U.S. Cl. .................. 428/653; 228/262.4; 428/594

(58) Field of Classification Search .................. 428/653
See application file for complete search history.

(56) References Cited

U.S. PATENT DOCUMENTS 2,006,973 A * 7/1935 Werder ..................... 138/171

FOREIGN PATENT DOCUMENTS

JP          5-8056        1/1993

(Continued)

OTHER PUBLICATIONS

ASM Handbook vol. 6 Welding, Brazing and Soldering, ASM International, May 1994, Gas-Metal Arc Welding by Holiday, D.B., pp. 180-185.*

(Continued)

*Primary Examiner*—Jennifer McNeil
*Assistant Examiner*—Adam C Krupicka
(74) *Attorney, Agent, or Firm*—Oblon, Spivak, McClelland, Maier & Neustadt, L.L.P.

(57) ABSTRACT

Disclosed are: a dissimilar material weld joint being formed by joining an iron type material and an aluminum type material and having not only a high strength but also an excellent ductility; and a weld joining method allowing such a joint to be stably produced. A dissimilar material weld joint 1 formed by joining an iron type material 2 and an aluminum type material 3, wherein: voids 4a are formed beforehand on the side of said iron type material 2 at a predetermined interval along a weld line 6; both said iron type and aluminum type materials are weld joined so that said voids 4a are filled with molten aluminum 7; and the minimum value of the ratio (L-Al)/(L-Fe) of the length (L-Al) of an aluminum type welding material 10 with which said voids 4a are filled to the length (L-Fe) of said iron type material 2 adjacent to said voids 4a filled with said aluminum type welding material 10 along said weld line 6 on the section containing said weld line 6 is in the range from 0.5 to 7, both the lengths (L-Al) and (L-Fe) being the lengths per 100 mm in length of the weld line 6 formed after welding.

8 Claims, 4 Drawing Sheets

FOREIGN PATENT DOCUMENTS

| | | |
|---|---|---|
| JP | 6-39558 | 2/1994 |
| JP | 6-63762 | 3/1994 |
| JP | 6-198458 | 7/1994 |
| JP | 8-141755 | 6/1996 |
| JP | 10-185040 | 7/1998 |
| JP | 11-197846 | 7/1999 |
| JP | 2000-94162 | 4/2000 |
| JP | 2003-33865 | 2/2003 |

OTHER PUBLICATIONS

Yoshihiko Sugiyama, "MIG Spot Welding Aluminium to Dissimilar Metals", Light Metal Welding, vol. 16, No. 12, 1978, pp. 8-16.

R.A. Stoehr, et al., "Gas Metal-Arc Spot Welding Joins Aluminum to Other Metals", Welding Journal, Apr. 1963, pp. 302-308.

Katsushi Matsumoto, et al., "Influence of forms of welded joint and welding condition on the strength of aluminum/steel joint by MIG welding", Preprints of the National Meetings of J.W.S., No. 75, Aug. 20, 2004, 11 Pages.

* cited by examiner

FIG.5

WELDING DIRECTION

FIG.6

DISSIMILAR MATERIAL WELD JOINT FORMED BY JOINING IRON TYPE MATERIAL AND ALUMINUM TYPE MATERIAL, AND WELD JOINING METHOD

BACKGROUND OF THE INVENTION

The present invention relates to a dissimilar material weld joint formed by joining an iron type material and an aluminum type material and a weld joining method, which dissimilar material weld joint is suitably applied to transport vehicles such as automobiles and railway vehicles, machine parts, structural members such as building structures, and the like and is particularly needed when structures for automobiles are fabricated.

If members comprising different kinds of metals (dissimilar material joints) of an iron type material (hereunder referred to simply as "a steel material") and an aluminum type material (a generic name of pure aluminum and aluminum alloys, and hereunder referred to simply as "an aluminum material") can be joined, it remarkably contributes to weight reduction and the like. However, when a steel material and an aluminum material are weld joined, brittle intermetallic compounds are likely to form at the weld and therefore it has been very difficult to obtain a reliable weld having a high strength (joint strength). Joining with bolts, rivets or the like has heretofore been applied to the joining of dissimilar materials (members of different metals) accordingly, but such joints have problems in reliability, airtightness, cost and others.

In this light, many studies have heretofore been done with regard to the joining method of a dissimilar material joint. Then, the following joining methods have been proposed for example;

a method of joining dissimilar materials by vacuum roll cladding (refer to Patent Document 1), a method of seam-welding dissimilar materials while interposing a two-layered clad material comprising an iron type material layer and an aluminum alloy layer which have been prepared beforehand (refer to Patent Document 2), a method of joining dissimilar materials by applying pressure bonding at a high temperature (refer to Patent Document 3), a method of joining dissimilar materials by interposing beforehand a Ti alloy on the joint surface thereof and then applying HIP treatment (refer to Patent Documents 4 and 5), a method of joining dissimilar materials by friction welding (refer to Patent Document 6), a method of joining dissimilar materials by plating a steel material on the surface facing aluminum with aluminum alloy or interposing a two-layered clad metal comprising an steel layer and an aluminum alloy layer prepared in advance, and then applying resistance welding (refer to Patent Documents 7 and 8), and a method of joining dissimilar materials by arc-welding a steel material and an aluminum material (refer to Non-patent Documents 1 and 2).

The above prior arts however have the following problems.

The methods of forming a dissimilar material joint by joining a steel material and an aluminum material as described in Patent Documents 1 to 8 are generally: applicable to the materials having relatively simple shapes, such as flat plates; but not applicable to members having complicated shapes because of the restrictions from the geometry of the members. As a consequence, the methods are only applicable to limited applications and thus inferior in versatility. Further, another problem is that, by the methods, since a weld is formed spotwise, a continuously extending weld cannot be obtained. Furthermore, another problem is that, since the methods require complicated processes, the stability of quality cannot be secured, the cost incurred in joining increases, and thus the methods lack in practicability. In addition, yet another problem is that the methods cannot be applied to an existing welding line, therefore new equipment has to be introduced if one of the methods is to be applied, and resultantly the equipment cost increases.

In contrast, in the case of the method of joining a steel material and an aluminum material by arc welding as described in the aforementioned Non-patent Documents 1 and 2, a high joint strength can be secured by controlling the direction in which intermetallic compounds acting as an impediment to the securement of strength develop. The method is the one wherein a hole is formed beforehand on the side of a steel material to be joined, then the hole is filled with molten aluminum material, and thereby the steel material and an aluminum material are joined.

One of the basic reasons why such various methods as described above are proposed in the case of the joining of a steel material and an aluminum material is that, when the steel material and the aluminum material melt and are directly joined to each other, brittle intermetallic compounds form at the weld and thus cracking is likely to occur. In that sense, when a steel material and an aluminum material are directly joined including the case of joining them with a welding wire, it becomes extremely important to adopt any one of the following means; 1) how to secure the ductility of the molten metal portion by inhibiting to the utmost iron in the steel material and aluminum in the aluminum material from melting and mixing, 2) how to avoid forming a brittle intermetallic compound layer in the vicinity of the interface between the steel material and the aluminum material, or 3) how to design the shape of a joint that does not hinder the mechanical properties thereof even if brittle intermetallic compounds are formed at the joint interface between the steel material and the aluminum material.

Then from that point of view, the present inventors have variously studied with the aim of establishing a joining method capable of securing a sound weld joint while resolving the problems described in the above items 1) and 2) as much as possible. As a result, the present inventors have found that, when the method is adopted of directly joining a steel material and an aluminum material by the MIG brazing method, a highly reliable weld joint can be obtained while avoiding various problems pointed out in the above prior arts (refer to Patent Document 9).

[Patent Document 1] JP-A No. 94162/2000
[Patent Document 2] JP-A No. 197846/1999
[Patent Document 3] JP-A No. 185040/1998
[Patent Document 4] JP-A No. 198458/1994
[Patent Document 5] JP-A No. 8056/1993
[Patent Document 6] JP-A No. 141755/1996
[Patent Document 7] JP-A No. 39558/1994
[Patent Document 8] JP-A No. 63762/1994
[Patent Document 9] JP-A No. 33865/2003
[Non-patent Document 1] WELDING JOURNAL, (1963), p. 302
[Non-patent Document 2] Light Metal Welding: Vol. 16 (1978), No. 12, p. 8

SUMMARY OF THE INVENTION

Nevertheless, the problem of the aforementioned Non-patent Documents 1 and 2 has been that, when a large number of holes are formed cyclically in proportion to the length of a joint and arc welding is applied continuously to form a weld line along the hole row, cracking occurs in the bead and rather the fatigue strength of the weld joint lowers. The reason is that brittle intermetallic compounds form inside the bead since the Fe type component in the steel material melts and mixes into the bead comprising an aluminum welding material. Meanwhile, the MIG brazing method described in the aforementioned Patent Document 9 has fewer restrictions on application conditions and others and is excellent in versatility when a steel material and an aluminum material are joined. However, it really happens that brittle intermetallic compounds such as Fe/Al type compounds are formed at the joint interface between a steel material and an aluminum material, and there has been still room for the improvement of joint strength.

In this light, the object of the present invention is: to further improve the performance of a joint formed by the joining method using arc welding, as disclosed in the aforementioned Patent Document 9, which makes the welding procedure very easy and allows linear welding; and more specifically to establish a joining method using arc welding, which joining method allows a joint excellent in ductility to be formed stably while securing a high strength.

The gist of a dissimilar material weld joint according to the present invention to attain the above object is a dissimilar material weld joint formed by joining an iron type material and an aluminum type material, wherein:

voids are formed beforehand on the side of said iron type material at a predetermined interval along a weld line; said voids are filled with molten aluminum welding material; both said iron type and aluminum type materials are weld joined so as to form a bead comprising said aluminum welding material; and the minimum value of the ratio (L-Al)/(L-Fe) of (L-Al) to (L-Fe), which are the lengths per 100 mm in length of the weld line formed after welding, is in the range from 0.5 to 7, where (L-Al) is the length of said aluminum welding material with which said voids are filled, along said weld line on the vertical section containing said weld line of said aluminum welding material; (L-Fe) is the length of said iron type material adjacent to the filled voids, along said weld line on the vertical section containing said weld line of said iron type material. It is preferable that the arc welding method using an aluminum welding wire is applied to the weld joining.

It is preferable that: the lower end portion of the weld formed by filling the voids with the molten aluminum welding material melts in the surface layer of the aluminum type material exposed at the voids and the upper end portion thereof melts and is joined to the bead which comprises the aluminum welding material and is formed over the surface of the iron type material; and, when the thickness of the aluminum type material is defined as Ta, the maximum melt-in depth to which the weld melts in the surface layer of the aluminum type material as D, the average thickness of the weld bead on the weld line as Tb, and the circle-equivalent radius of the voids as R, the value D/Ta is not less than 0.10 and the value Tb/R is not less than 0.50.

Further, the weld joining method of a dissimilar material weld joint comprising an iron type material and an aluminum type material according to the present invention to attain the above object is a method of joining an iron type material and an aluminum type material to form a dissimilar material weld joint by arc welding, wherein an iron type material and an aluminum type material are joined by the arc welding method and said dissimilar material weld joint is formed, wherein:

voids are formed beforehand on the side of said iron type material at a predetermined interval along a weld line;

said iron type material placed on the upper side and said aluminum type material placed on the lower side are joined with an aluminum welding wire while filling said voids with molten aluminum welding material in a manner of forming a bead comprising said aluminum welding material; and both said iron type and aluminum type materials are weld joined so that the minimum value of the ratio (L-Al)/(L-Fe) of (L-Al) to (L-Fe), which are the lengths per 100 mm in length of the weld line formed after welding, is in the range from 0.5 to 7, where (L-Al) is the length of said aluminum welding material with which said voids are filled, along said weld line on the vertical section containing said weld line of said aluminum welding material; (L-Fe) is the length of said iron type material adjacent to the filled voids, along said weld line on the vertical section containing said weld line of said iron type material.

In addition, in the above welding conditions, it is preferable that, when the quantity of heat input Q (kj/cm) in arc welding is defined by the following expression and the thickness of the aluminum type material is defined as Ta (mm), welding is applied so as to satisfy the expression $Ta/3.5 \leq Q \leq Ta/1.4$ in the case of an AC power source or the expression $Ta/1.5 \leq Q \leq Ta/0.7$ in the case of a DC power source;

$Q$(kj/cm)=60 (s./min.)×Welding current (A)×Welding voltage (V)/Welding speed (cm/min.)/1,000.

By forming holes on the side of a steel material to be joined beforehand and filling the holes with molten aluminum supplied from a welding material such as an aluminum welding wire or the like in the same way as the method of joining a steel material and an aluminum material by arc welding indicated in the aforementioned Non-patent Documents 1 and 2, it becomes possible to control the direction in which intermetallic compounds acting as an impediment to the securement of joint strength develop.

In the case of Non-patent Documents 1 and 2, when the length of a joint or a joint line is long, it is necessary to form many holes in proportion to the length. However, as stated above, the problem has been that, when arc welding is applied to form a weld line along the row of the many holes, cracking occurs in the bead comprising an aluminum welding material and rather the fatigue strength of the weld joint lowers. The reason is that brittle intermetallic compounds form inside the bead since the Fe type component in the steel material melts and mixes into the bead comprising the aluminum welding material.

To cope with the problem, the present inventors have found that, by controlling in a prescribed range the ratio of the length (width) of an aluminum welding material with which the holes (the voids) are filled to the length (width) of an iron type material adjacent to the holes filled with the aluminum welding material along a weld line formed after joining, it becomes possible to inhibit to the utmost the iron type material from melting and mixing into the weld bead formed on the surface by the melting and solidification of the aluminum welding material. Thereby, it becomes possible to inhibit brittle Fe—Al type intermetallic compounds from forming inside the bead, thus to inhibit the bead surface from cracking, and to obtain a high joint strength even when the joint line of a joint is long.

Further, when the maximum melt-in depth to which a weld formed by melting in the voids of an iron type material and filling the voids with a welding material melts in an aluminum type material is defined as D, the average thickness of the weld bead formed on the surface of the iron type material by melting and being joined to the weld as Tb, the thickness of the aluminum type material as Ta, and the circle-equivalent radius of the penetrating holes as R, by controlling the value D/Ta to not less than 0.10 and the value Tb/R to not less than 0.50, the weld exhibits excellent rivet functions and an excellent joint strength is further secured.

As a consequence, the present invention makes it possible to directly join an iron type material and an aluminum type material, which has heretofore been regarded as being difficult since brittle intermetallic compounds are formed. Thereby, the formed joint does not have defects such as cracking and a sound weld joint having higher joint strength and ductility can be obtained. Moreover, by adopting a joining method according to the present invention, it becomes possible to join an iron type material and an aluminum type material continuously in an efficient manner, and to easily produce the joint.

Other and further objects, features and advantages of the invention will appear more fully from the following description.

DETAILED DESCRIPTION OF THE PREFERRED EMBODIMENTS

The embodiments of the present invention and the reasons for limiting the requirements in the present invention are concretely explained hereunder.

(Dissimilar Material Weld Joint)

Figure 1A:
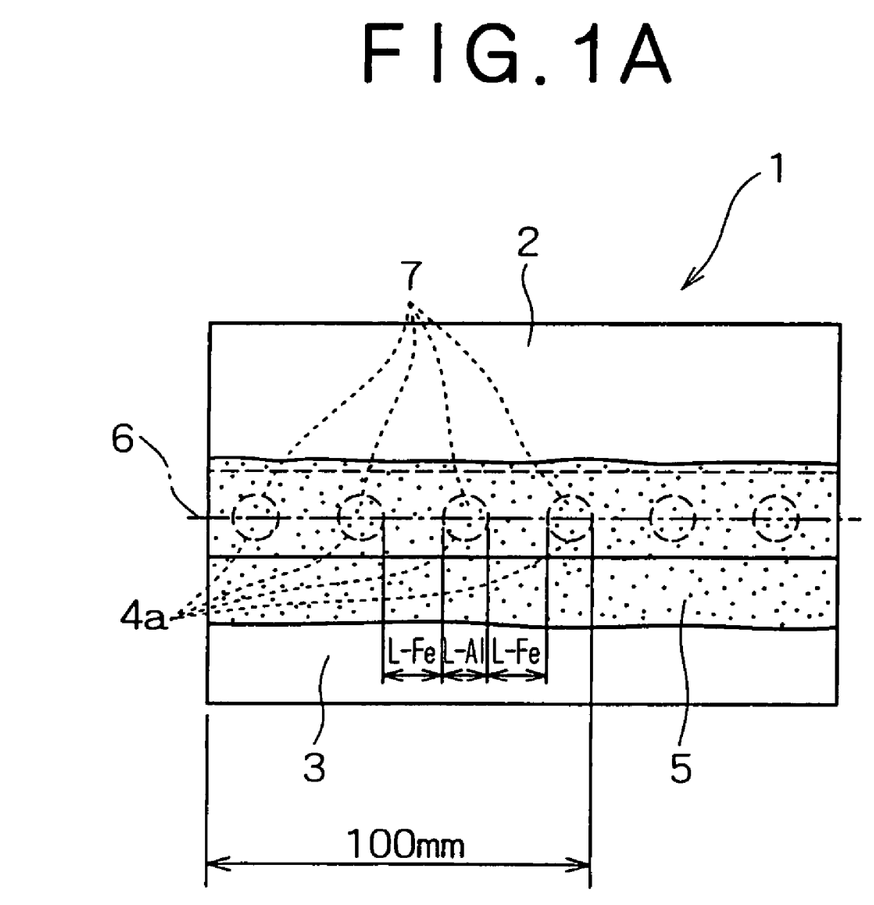
FIG. 1A (the plan view) and FIG. 1B (the side view) show an embodiment of a dissimilar material weld joint according to the present invention.
Figure 1B:
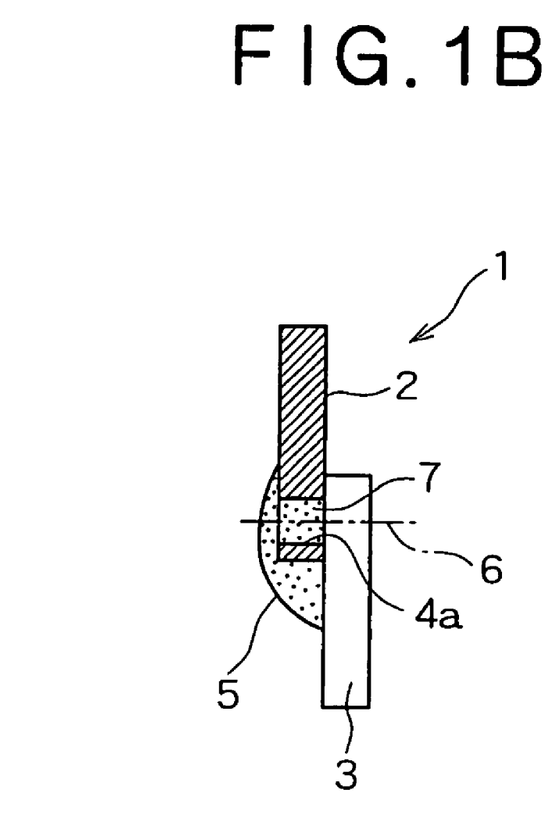

FIG. 1A (the plan view) and FIG. 1B (the side view) show an embodiment of a dissimilar material weld joint stipulated in the present invention. In FIG. 1A, the dissimilar material weld joint 1 is formed by laying the upper steel material (steel sheet) 2 on the lower aluminum material (aluminum alloy sheet) 3 and joining them by arc welding along the weld line 6. The reference numeral 5 is the weld bead formed on the surface of the weld by melting and solidifying an aluminum welding material supplied from an aluminum welding wire or the like. Here, FIG. 1A shows the weld structure excluding the weld bead 5 formed on the upper side. The reference character 4a represents a plurality of round holes which are voids formed beforehand on the joining side of the steel material 1 at intervals along the weld line. The reference numeral 7 is the aluminum welding material supplied from an aluminum welding wire or the like and formed by melting and solidifying after the round holes 4a are filled therewith at the time of weld joining.

(P Value)

In FIG. 1A, L-Al represents the length along the weld line of the aluminum welding material (the width of the aluminum welding material), stipulated in the present invention, formed after joining by filling the round holes 4a with the aluminum welding material and solidifying it. Also, L-Fe represents the length along the weld line of the steel material adjacent to the holes (of the length L-Al) (the interval between adjacent round holes 4a) stipulated in the present invention. The present invention stipulates that both the materials are weld joined so that the minimum value of the ratio (L-Al)/(L-Fe) of the length (L-Al) to the length (L-Fe), which are the lengths per 100 mm in length of the weld line 6 formed after joining (hereunder referred to as "P value" occasionally) is in the range from 0.5 to 7. In FIG. 1A for example, four figures are obtained as the length (L-Al) and three figures are obtained as the length (L-Fe) in the range of 100 mm in length of the weld line 6 formed after joining. Then, the minimum value (the P value) is determined from among the ratios (L-Al)/(L-Fe) of the lengths (L-Al) to the adjacent lengths (L-Fe), which figures are obtained in the above range, and the minimum value P is controlled so as to be in the range from 0.5 to 7 as stated above. Here, the portion of the weld line 6 used as the unit length 100 mm is arbitrarily selected from the actual weld line 6. Further, the weld line 6 may be either a straight line or a curved line. Note that, when the weld line is long (for example 500 mm or longer), the P value is determined by measuring P values at plural portions of the unit length 100 mm selected arbitrarily on the weld line used as and averaging the measured P values. When a P value (the minimum value of (L-Al)/(L-Fe)) deviates from the range from 0.5 to 7, as shown in the examples to be hereinafter described, the amount of the iron type material melting and mixing into the weld bead mainly composed of aluminum increases excessively. Thereby, brittle intermetallic compounds form in quantity and that leads to cracking in the weld bead.

A P value exceeding 7 means that the length of a round hole 4a (a void of a steel material) and the length of the steel material portion (the non-void portion of the steel material) are close to each other (the interval between a round hole 4a and the next round hole 4a is too short). In this case, heat imposed to fill the round holes 4a (the voids) with molten aluminum material at the time of welding tends to accumulate at the steel material portions (non-void portions). As a result, when a welding arc spot moves to a steel material portion (a non-void portion), the heat at the steel material portion (the non-void portion) is large and hence iron tends to melt into the aluminum molten metal that forms a bead. As a consequence, intermetallic compounds form in quantity and the bead is likely to crack. In contrast, a P value less than 0.5 means that the length of the steel material portion (the non-void portion of the steel material) is longer than the length of a round hole 4a (a void of a steel material) (the interval between a round hole 4a and the next round hole 4a is too long). In this case, when welding arc moves through a steel material portion (a non-void portion), the temperature of the steel material portion (the non-void portion) to be subsequently welded rises undesirably as the welding proceeds. Thereby the same phenomenon as the case of a too large P value occurs as a result and the bead cracks likewise.

As long as a P value is in such a range as stipulated in the present invention, it becomes possible to properly dissipate the heat of a steel material portion (a non-void portion) heated by arc. As a result, the steel material portion (the non-void portion) can be prevented from being excessively heated. Thereby, it becomes possible to prevent the cracking of a bead from occurring and to obtain a high performance weld joint excellent in not only strength and ductility but also fatigue strength. Note that, it is not necessary to fill all the round holes 4a or voids of various shapes to be hereinafter described with aluminum, but there is the possibility that the void portions that are not filled with aluminum may act as the origins of stress concentration. For that reason, it is recommended to fill all round holes 4a or voids with a welding material.

(Weld Joining Method of a Dissimilar Material Joint)

Figure 2:
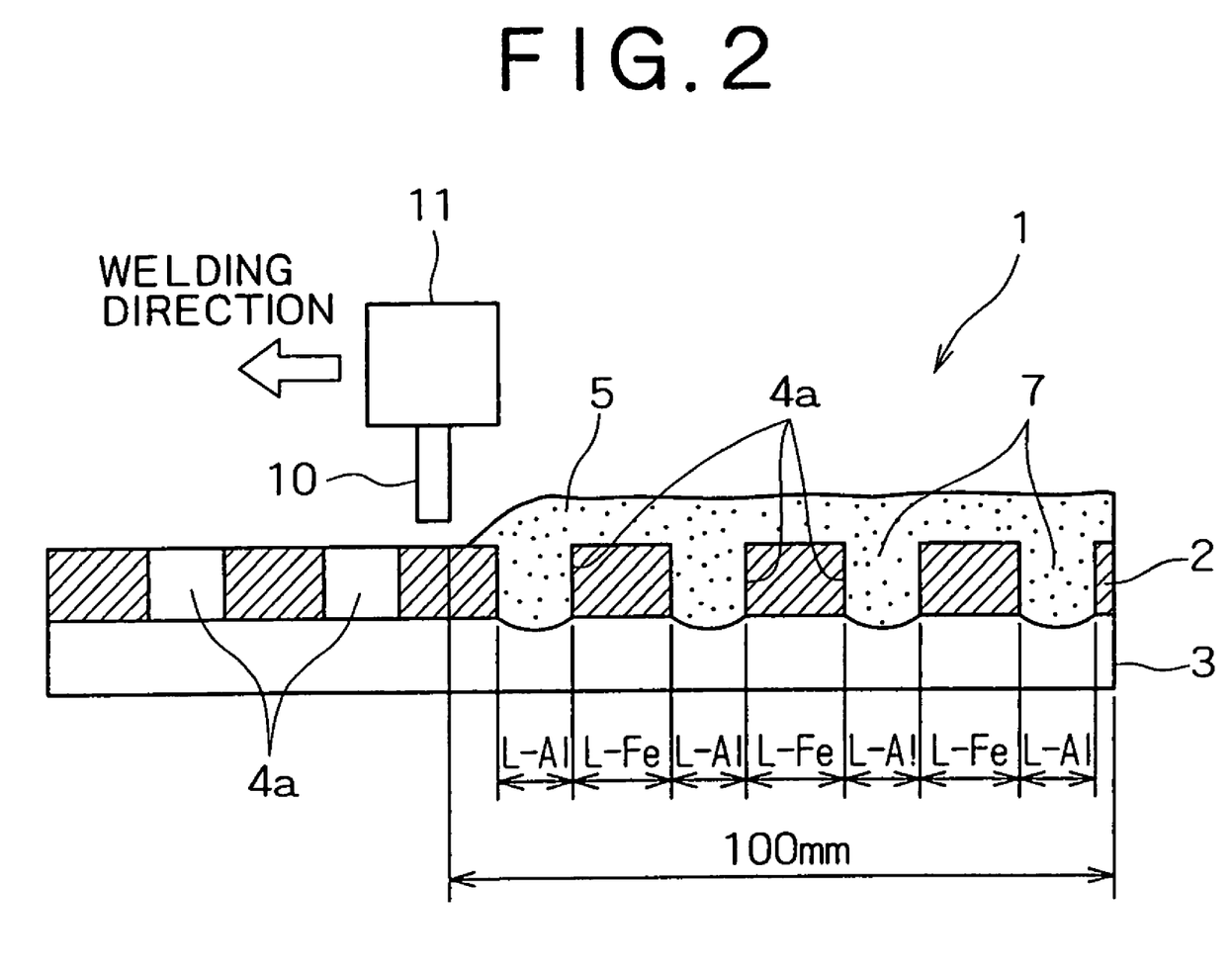
FIG. 2 is a front view showing an embodiment of a weld joining method of a dissimilar material weld joint according to the present invention.

FIG. 2 is a front view showing an embodiment of a weld joining method of a dissimilar material weld joint stipulated in the present invention. FIG. 2 shows the method of forming a dissimilar material joint by the arc welding method. In FIG. 2, the reference numeral 11 is a welding torch and the reference numeral 10 is an aluminum welding wire, and welding is carried out and the aluminum bead 5 is formed while the welding torch and the aluminum welding wire move along the portion formed by laying the upper steel material (steel sheet) 2 on the lower aluminum material (aluminum alloy sheet) 3 in the direction shown by the arrow in FIG. 2 (from the right side to the left side in FIG. 2). The reference character 4a represents a plurality of round holes, namely voids, formed beforehand on the joining side of the steel material 2 at intervals along the weld line. FIG. 2 shows the state wherein: the two round holes 4a on the left side are not yet filled with an aluminum welding material; and the round holes 4a formed on the right side thereof are filled with the aluminum welding material 7 formed by being supplied from an aluminum welding wire or the like, melting and solidifying while the welding torch passes through the round holes 4a.

Then, also in FIG. 2, the steel material 2 and the aluminum material 3 are weld joined so that a P value which is the minimum value of the ratio (L-Al)/(L-Fe) of the length (L-Al) to the length (L-Fe) per 100 mm in length of the weld line 6 formed after joining is in the range from 0.5 to 7. In order to melt and solidify an aluminum welding material and fill the round holes 4a formed beforehand in the steel material 2 with the aluminum welding material, it is necessary that: an aluminum welding wire is used; a steel material (an iron type material) is placed on the upper side and an aluminum material (an aluminum type material) is placed on the lower side; and then arc welding is applied. When any one of the above requirements is not satisfied, then it is impossible to melt and solidify an aluminum welding material and fill the round holes 4a formed in the steel material 2 with the aluminum welding material.

(Aluminum Weld)

Figure 3:
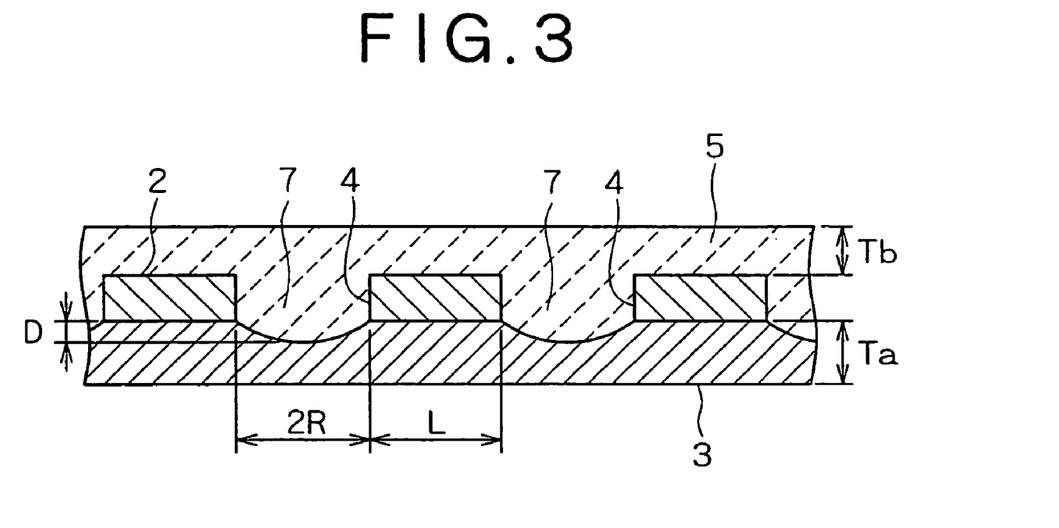
FIG. 3 is an expanded sectional view of the substantial part taken on the weld line in FIG. 1A.

As shown in FIG. 3, an aluminum weld 7 is formed by filling the holes (voids) 4 of the steel material 2. The lower end of the aluminum weld 7 melts and is joined in the state wherein the aluminum weld 7 melts into the surface layer of the aluminum material 3 exposed in the hole 4 and the portion where the aluminum weld 7 melts into the surface layer is formed from the inner lower circumference of the hole 4 to the maximum depth (the maximum melt-in depth of the melted portion is defined as D) at the center portion of the hole 4. Meanwhile, the upper ends of the aluminum weld 7 melt into and are integrated in the weld bead 5 formed over the surface of the steel sheet 2 along the weld line. The distance from the upper face of the steel sheet 2 to the upper face of the weld bead 5 is called a bead thickness and the average thickness along the weld line 6 is expressed by Tb. The weld bead 5, the aluminum weld 7 and the melt-in portions are formed integrally with an aluminum welding material supplied by melting a welding wire.

In the present invention, it is preferable that the ratio D/Ta is not less than 0.10 when the thickness of an aluminum material 3 is defined as Ta. As it is obvious from the examples to be hereinafter described, with the ratio D/Ta of less than 0.10, an aluminum welding material melting in an aluminum material 3 is small in amount, an aluminum weld 7 tends to break along the interface of the melt-in portion, and thus a sufficient joint strength cannot be obtained. For that reason, the lower limit of the ratio D/Ta is preferably 0.10, or yet preferably 0.40. In the present invention, it is preferable that the ratio Tb/R is not less than 0.50. With the ratio Tb/R of less than 0.50, breakage occurs at a weld bead 5, and the weld bead 5 and aluminum weld 7 do not play the role of rivets. For that reason, the lower limit of the ratio Tb/R is preferably 0.50, or yet preferably 0.70. Note that, when the melt-in portion increases, molten aluminum welding material penetrates through an aluminum material 3 and extends onto the bottom surface, and thus a weld bead 5 is not formed. For that reason, it is not specifically necessary to regulate the upper limit of the ratio D/Ta and it is enough if the lower limit of the ratio Tb/R is regulated.

(Void of Steel Material)

Figure 4A:
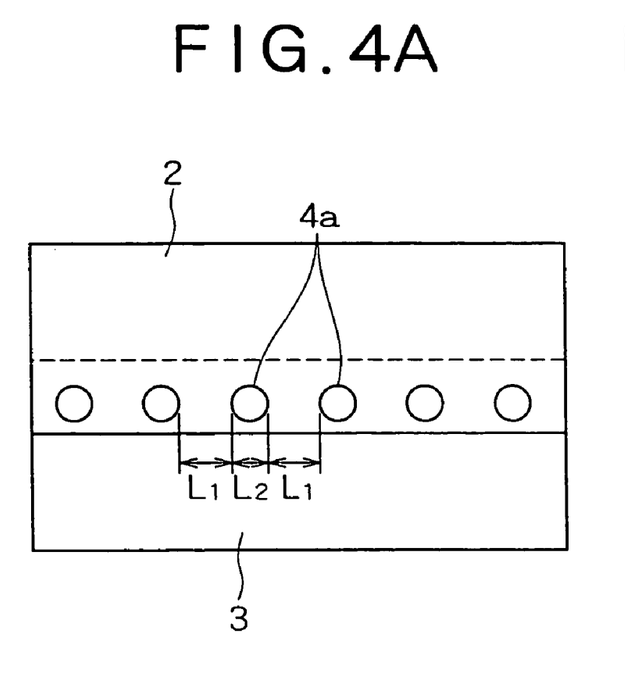
FIG. 4A (the plan view) and FIG. 4B (the side view) show the state before welding, wherein a steel material and an aluminum material are laid on each other.
Figure 4B:
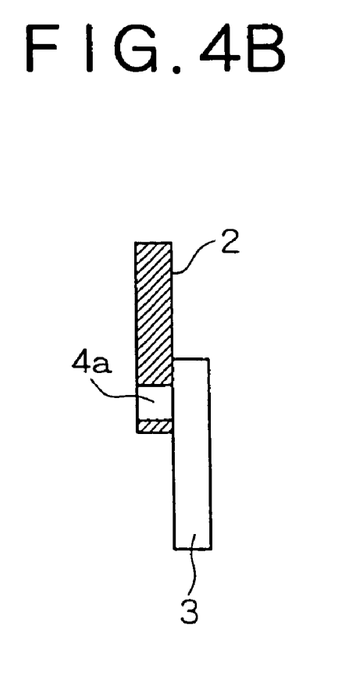

FIG. 4A (the plan view) and FIG. 4B (the side view) show the state wherein the steel material 2 and the aluminum material 3 are laid on each other before they are subjected to welding. As shown in FIG. 3, the interval L1 between a round hole 4a and an adjacent round hole 4a, those holes being the voids formed beforehand in the steel material 2, determines the length L-Fe as a constituent element of a P value. Likewise, the diameter (width) L2 of each round hole 4a determines the length L-Al as the other constituent element of a P value. Then, the interval L1 between adjacent two round holes 4a and the diameter (width) L2 of each round hole 4a are set so that the P value is in the range from 0.5 to 7 after welding in accordance with the joint and the welding conditions.

Figure 5:
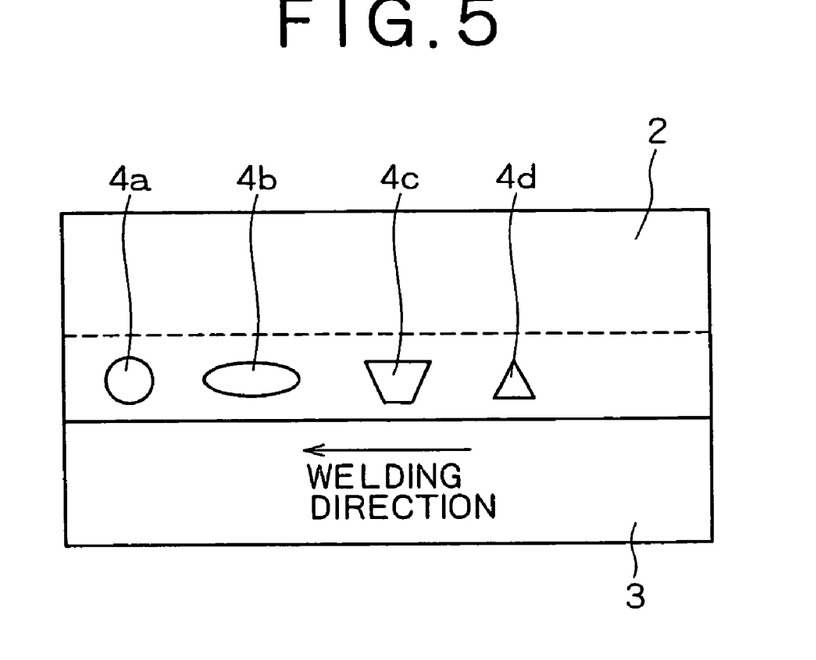
FIG. 5 is a plan view showing the shapes of the voids of a steel material.
Figure 6:
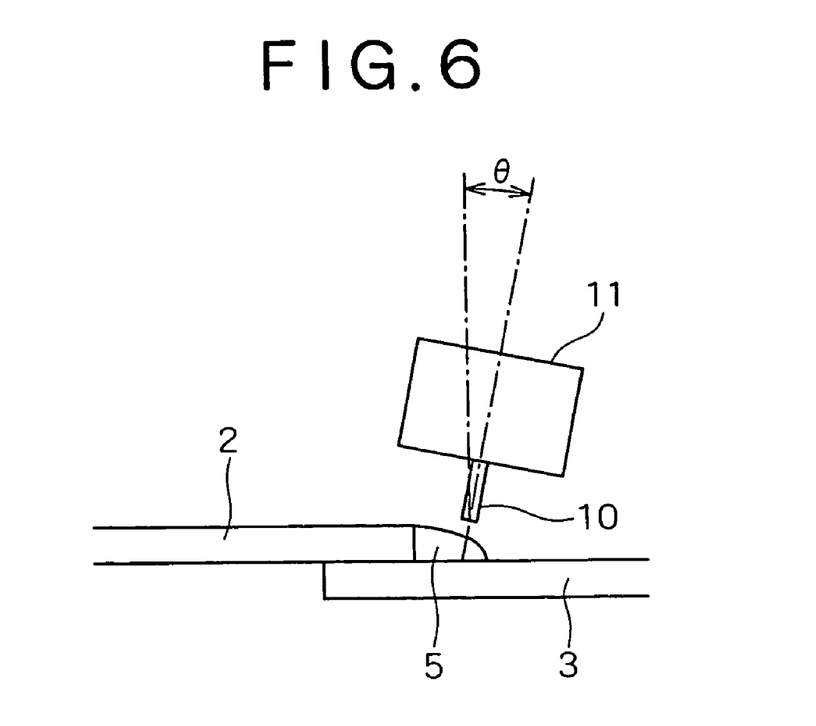
FIG. 6 is a sectional view showing an embodiment of the lap joint weld test employed in Examples.

Here, the shape of a void formed in a steel material is not limited to such a round hole 4a (a circular hole) but can arbitrarily be selected from among a round shape, a square shape, a polygonal shape, an indeterminate shape, and a combination thereof, including an elliptical shape 4b, a trapezoidal shape 4c, and a triangular shape 4d shown in FIG. 5, as long as the shape can exhibit the effect of the present invention and can be formed easily. Note that, in the case of a shape having corners like a square shape for example, even if a void is filled with molten aluminum, there is the possibility that the corner portions become the sites of stress concentration and that lowers the strength and fatigue strength of a joint. From this point of view, a round shape, an elliptical shape, or the like having no corner portions and hardly causing stress concentration is desirable.

(Welding Conditions)

As stated above, in order to inhibit intermetallic compounds from forming at the interface between an aluminum material and a steel material, with regard to welding conditions, it is preferable to weld them so that a sound joining state may be secured with the minimum required amount of the molten (diluting) base material while avoiding the excessive melting of the steel material as the base material. Here, with regard to a welding method, any method can be adopted as long as voids of a steel material are filled and an aluminum welding material can be supplied to form a bead, and laser welding or the like may be adopted. Therefore no particular limitation is set, but the arc welding method is recommended in consideration of versatility.

(In the Case of Arc Welding)

In arc welding recommended from the viewpoint of versatility, it is desirable to control welding current so as not to be excessive during welding. In view of this, the arc welding conditions desirable for the performance of the present invention are as follows.

A desirable welding condition for forming such a weld joint is to control a welding current, a welding voltage and a welding speed so that, when the quantity of heat input Q (kj/cm) in arc welding is defined by the following expression and the thickness of an aluminum type material is defined as Ta (mm), welding is applied so as to satisfy the expression Ta/3.5≦Q≦Ta/1.4 in the case of an AC power source or the expression Ta/1.5≦Q≦Ta/0.7 in the case of a DC power source;

$Q$(kj/cm)=60 (s./min.)×Welding current (A)×Welding voltage (V)/Welding speed (cm/min.)/1,000.

As it is obvious from the examples to be hereinafter described, if Q is less than Ta/3.5 (in the case of an AC power source) or less than Ta/1.5 (in the case of a DC power source), the melting of an aluminum weld into an aluminum material is insufficient, and in contrast, if Q exceeds Ta/1.4 (in the case of an AC power source) or Ta/0.7 (in the case of a DC power source), the melting of an aluminum weld into an aluminum material is excessive and, in an extreme case, the aluminum weld penetrates through the aluminum material and therefore a necessary bead thickness cannot be secured. By controlling the quantity of heat input in the aforementioned range, the conditions that the value D/Ta is not less than 0.10 and the value Tb/R is not less than 0.50 are satisfied, an aluminum weld exhibits excellent rivet functions, and an excellent joint strength can be obtained.

Arc welding conditions desirable for the performance of the present invention are as follows on the premise that the aforementioned regulation on the quantity of heat input is satisfied.

Welding Current:

In the case of an AC power source, it is not less than 60 A, preferably not less than 70 A and not more than 100 A, preferably not more than 90 A. On the other hand, in the case of a DC power source, it is not less than 60 A, preferably not less than 70 A and not more than 140 A, preferably not more than 130 A.

Welding Voltage:

In the case of an AC power source, it is not less than 10 V, preferably not less than 11 V and not more than 15 V, preferably not more than 14 V. On the other hand, in the case of a DC power source, it is not less than 13 V, preferably not less than 14 V and not more than 19 V, preferably not more than 18 V.

Welding Speed:

In either of the cases of an AC power source and a DC power source, it is not less than 20 cm/min., preferably not less than 30 cm/min. and not more than 120 cm/min., preferably not more than 100 cm/min.

Shielding Gas:

A generally used gas including an Ar gas can arbitrarily be used. With regard to a gas flow rate, a generally employed flow rate can be selected and no regulation is set.

Welding Torch (Arc Torch) Angle:

No regulation is set and an angle θ is arbitrarily selected in accordance with the welding conditions of a joint.

Note that, when arc welding is applied to the present invention, a steel material and an aluminum material can directly be joined and therefore, as long as a welding current, a welding voltage, a joint geometry and others are adequately selected, no particular restriction is imposed, the applicable range and versatility expand, and moreover there is the effect of enabling continuous joining. Then as stated above, a sound joining state can be secured with the minimum required amount of the molten (diluting) steel material in a weld metal such as a bead, brittle intermetallic compounds are hardly formed, and resultantly a high joint strength can be obtained.

(Welding Wire)

The material of a welding wire used in arc welding may arbitrarily be selected in accordance with a joint and welding conditions as long as the material is of an aluminum type that can fill the voids of a steel material and supply the aluminum welding material for forming a bead. For example, a heretofore known Al—Si type wire or Al—Mg type wire can be used. More specifically, various materials stipulated in JIS can be used. For example, preferably used is A4043-WY, A4047-WY or the like as an Al—Si type wire or A5554-WY, A5356-WY, A5183-WY or the like as an Al—Mg type wire. However, a welding wire is not limited to those materials.

(Iron Type Material)

An iron type material cited in the claims of the present invention means a steel material of an ordinary steel, a high tensile strength steel or the like. In the present invention, the kind or the shape of a steel material used for a joint is not particularly limited and a material having an arbitrary shape, such as a steel sheet, a shape, a steel pipe or the like, can be used, which is generally used for a structural member or is selected on the basis of application to a structural member. Moreover, a hot-dip galvanized steel sheet produced by applying hot-dip galvanizing to such a steel sheet can also be used. In that context, the term "iron type material" is used in the claims of the present invention. Here, in order to secure the strength of a joint and a steel material, it is preferable to use a high tensile strength steel.

(Aluminum Type Material)

An aluminum type material cited in the claims of the present invention means an aluminum material such as a pure aluminum type material or an aluminum alloy type material. The kind of alloy or the shape of an aluminum material used in the present invention is not particularly limited and a generally used sheet material, shape material, forged material, cast material or the like can arbitrarily be selected in accordance with the properties required as a structural member. In that context, the term "aluminum type material" is used in the claims of the present invention.

The present invention is hereunder explained more specifically on the basis of examples. The present invention is naturally not limited to the after-mentioned examples, any arbitrary modification can be accepted as long as it is in conformity with the aforementioned or after-mentioned tenor of the present invention, and those modifications are included in the technological scope of the present invention.

EXAMPLES

Example 1

The present inventors laid a steel sheet (extending from a mild steel sheet SPCE to a high tensile strength steel sheet of up to 980 MPa) in which voids (holes) were formed according to the present invention on an aluminum alloy sheet (A5182), subjected them to lap weld tests using various kinds of aluminum welding wires, thus produced a dissimilar material weld joint, and then evaluated it.

In Table 1, shown are the conditions (the grade and the thickness) of the steel sheets and the aluminum alloy sheets used in the present weld tests, the welding wire condition (the grade), the welding conditions (the electric current, the voltage and the welding speed), the void conditions (the shape and the parameter P value), the evaluation results (existence of bead cracking and the tensile strength and elongation of the joints), and others. Here, an AC power source was used for all the welding. Then, in order to facilitate the evaluation in the present weld tests, a round shape was adopted as the shape of the voids formed in all the steel type materials and the diameter thereof was used as the parameter of the size.

An aluminum alloy sheet and a steel sheet were laid on each other so that, as shown in the sectional view of FIG. 5, the steel sheet test piece 2 was laid on the upper side and the aluminum alloy sheet test piece 3 was laid on the lower side, and a lap joint was formed. The size of the test piece planes of both the steel sheet and the aluminum alloy sheet was 100 mm×300 mm, and they were laid on each other at the sides of 300 mm in length and subjected to MIG welding over the length (the length of the weld line was 300 mm accordingly). An aluminum welding wire 10 of 1.2 mm in diameter was used. As the shielding gas, an Ar gas (the flow rate was 20 to 25 l./min.) was used. The angle θ of the welding torch (the arc torch) 11 was fixed to 80°.

After the welding (the joining), the existence of the cracking in a bead 5 was evaluated according to the following criteria, and also a test piece 30 mm in sheet width to evaluate the strength of a joint was cut out from a weld joint, subjected to a tensile test at a speed of 25 mm/min., and then the strength (in MPa) of the joint was calculated on the basis of the following expression; Strength of a joint (MPa)=Maximum point load (MPa)/Sectional area of a joint (mm). Here, the sectional area of a joint was defined by the sectional area of an aluminum alloy sheet in the sheet thickness direction.

Evaluation Criteria of Bead Cracking:

The bead cracking was evaluated by inspecting the existence of cracking at a weld joint through visual inspection and a penetrant test;

⊚: No cracking at all,

○: The number of cracks per 100 mm in weld length is not more than two,

X: The number of cracks per 100 mm in weld length is not less than three

As it is obvious from Table 1, in the cases of the invention examples 5 to 14, the welding condition parameter P values were in the range from 0.5 to 7 and high joint strengths of 120 MPa or more were stably obtained. Further, in those cases, the elongations were not less than 4% and the ductility of the joints was also high. In conclusion, in the cases of the invention examples 5 to 14, obtained could be sound joints that had not only high strength and ductility but also excellent joint strength and moreover no cracking at the weld joints. On the other hand, in the cases of the comparative examples 1 to 3, the P values exceeded the upper limit 7. As a result, though joint strengths of 100 MPa or more were obtained, bead cracking occurred and those were not sound weld joints. Also in the case of the comparative example 4 wherein the P value was less than the lower limit 0.5, though a joint strength of 100 MPa or more was obtained, bead cracking occurred and that was not a sound weld joint. From the results of the examples, the critical significance of the requirements stipulated in the present invention can be understood.

TABLE 1

| | | Joining material | | | | Steel material void conditions | | | |
| | | Steel material | | Aluminum material | | | | | |
| No. | Category | Type | Thickness mm | Type | Thickness mm | Shape | L-Fe | L-Al | P value |
|---|---|---|---|---|---|---|---|---|---|
| 1 | Comparative | SPCE | 1.0 | A5182 | 1.4 | Round | 3 | 25 | 8.3 |
| 2 | example | SPCE | 1.2 | A5182 | 1.6 | Elliptic | 0.1 | 5 | 50.0 |
| 3 | | SPCE | 2.0 | A5182 | 3.5 | Round | 4 | 30 | 7.5 |
| 4 | | 590 MPa* | 1.2 | A5182 | 1.6 | Round | 6 | 2 | 0.3 |
| 5 | Invention | SPCE | 1.2 | A5182 | 1.6 | Round | 4 | 7 | 1.8 |
| 6 | example | 590 MPa* | 1.2 | A5182 | 1.6 | Round | 5 | 15 | 3.0 |
| 7 | | SPCE | 1.2 | A5182 | 2.0 | Elliptic | 5 | 7.5 | 1.5 |
| 8 | | SPCE | 1.2 | A5182 | 3.5 | Round | 6 | 18 | 3.0 |
| 9 | | 980 MPa* | 1.2 | A5182 | 1.6 | Round | 3 | 6 | 2.0 |
| 10 | | 590 MPa* | 1.6 | A5182 | 3.0 | Round | 5 | 7.5 | 1.5 |
| 11 | | SPCE | 1.2 | A5182 | 1.6 | Elliptic | 5 | 10 | 2.0 |
| 12 | | SPCE | 1.2 | A5182 | 2.0 | Elliptic | 4 | 7 | 1.8 |
| 13 | | 590 MPa* | 1.2 | A5182 | 1.6 | Round | 1 | 5 | 5.0 |
| 14 | | 590 MPa* | 2.0 | A5182 | 2.0 | Round | 2 | 6 | 3.0 |

| | Welding wire | | Welding conditions | | | Weld joint performance | | |
| | | | | | Welding | Tensile | | |
| No. | Type | Diameter mm | Electric current A | Voltage V | speed cm/min. | strength MPa | Elongation % | Bead cracking |
|---|---|---|---|---|---|---|---|---|
| 1 | A4043-WY | 1.2 | 75 | 10 | 25 | 105 | 4.5 | X |
| 2 | A5183-WY | 1.2 | 60 | 14 | 30 | 120 | 5.1 | X |
| 3 | A5356-WY | 1.2 | 80 | 10 | 25 | 149 | 4.8 | X |
| 4 | A5183-WY | 1.2 | 70 | 12 | 30 | 110 | 6.3 | X |
| 5 | A4043-WY | 1.2 | 90 | 15 | 35 | 142 | 4.6 | ○ |
| 6 | A4043-WY | 1.2 | 70 | 10 | 25 | 135 | 5.1 | ○ |
| 7 | A5183-WY | 1.2 | 60 | 10 | 30 | 158 | 7.1 | ⊚ |
| 8 | A5356-WY | 1.2 | 85 | 12 | 30 | 174 | 8.9 | ⊚ |
| 9 | A5356-WY | 1.2 | 75 | 12 | 60 | 182 | 8.4 | ⊚ |
| 10 | A5183-WY | 1.2 | 70 | 15 | 30 | 187 | 9.6 | ⊚ |
| 11 | A4043-WY | 1.2 | 60 | 15 | 35 | 134 | 4.2 | ○ |
| 12 | A4043-WY | 1.2 | 80 | 10 | 25 | 146 | 4.9 | ○ |
| 13 | A5356-WY | 1.2 | 65 | 10 | 30 | 155 | 5.1 | ○ |
| 14 | A4043-WY | 1.2 | 70 | 20 | 35 | 135 | 4.5 | ○ |

*High tensile strength steel

Example 2

The present inventors produced weld joints by joining steel sheets ("GA" in the column "Type" meant a hot-dip galvanized steel sheet) and aluminum alloy sheets shown in Table 2 below under various heat input conditions through arc welding using an AC power source and various kinds of aluminum welding wires. In the steel sheets, round-shaped voids of the diameters (2R, R meant a circle-equivalent radius) shown in Table 2 were formed beforehand at the intervals (the lengths of the non-void portions) shown in Table 2. In the arc welding, an Ar gas (flow rate of 20 to 25 l./min.) was used as the shielding gas. The angle of the welding torch was set at 80°. Here, the Mg contents in the aluminum welding wires used here were as follows; 0.05% or less for A4043-WY, 4.3 to 5.2% for A5183-WY, 4.5 to 5.5% for A5356-WY, and 2.4 to 3.2% for A5554-WY.

The produced weld joints were visually inspected to judge the existence of bead cracking and also the joint strength thereof was measured. The bead cracking was evaluated in the same manner as shown in Example 1. The joint strength was determined by counting the number of rivets (aluminum welds) on the fractured pieces of each specimen (test piece) after subjected to a tensile test, calculating the bonded area of each specimen, and then dividing the breaking load by the calculated value. The results are shown in Table 3. Here, the materials used for joining are also shown in Table 3.

As it is obvious from Tables 2 and 3, in the case of an AC power source, when the welding condition (heat input Q) satisfied the expression $Ta/3.5 \leq Q \leq Ta/1.4$ (Ta meant the thickness of an aluminum alloy sheet), in every case, the value Tb/R was not less than 0.50 and the value D/Ta was not less than 0.10, and thus an excellent weld joint having an excellent joint strength of 90 MPa or higher and scarce bead cracking could be obtained.

TABLE 2

| | Joining material | | | | | | | Welding conditions | | | |
|---|---|---|---|---|---|---|---|---|---|---|---|
| | Steel material | | Aluminum material | | Steel material void conditions | | | Welding wire | | | |
| Sample No. | Type | Thickness mm | Type | Thickness Ta mm | L-Fe | L-Al | P value | Type | Diameter mm | Electric current A | Voltage V | Welding speed cm/min. | Heat input kJ/cm |
| 1 | 590 MPa* | 1.2 | A5182 | 1.6 | 3 | 4.0 | 1.3 | A5183WY | 1.2 | 70 | 10 | 90 | 0.47 |
| 2 | 590 MPa* | 1.2 | A5182 | 1.6 | 3 | 4.0 | 1.3 | A5183WY | 1.2 | 70 | 10 | 70 | 0.60 |
| 3 | 590 MPa* | 1.2 | A5182 | 1.6 | 3 | 4.0 | 1.3 | A5183WY | 1.2 | 70 | 10 | 60 | 0.70 |
| 4 | 590 MPa* | 1.2 | A5182 | 1.6 | 3 | 4.0 | 1.3 | A5183WY | 1.2 | 70 | 10 | 50 | 0.84 |
| 5 | 590 MPa* | 1.2 | A5182 | 1.6 | 3 | 4.0 | 1.3 | A5183WY | 1.2 | 70 | 10 | 40 | 1.05 |
| 6 | 590 MPa* | 1.2 | A5182 | 1.6 | 2 | 4.0 | 2 | A4043WY | 1.2 | 70 | 10 | 90 | 0.47 |
| 7 | 590 MPa* | 1.2 | A5182 | 1.6 | 2 | 4.0 | 2 | A4043WY | 1.2 | 70 | 10 | 70 | 0.60 |
| 8 | 590 MPa* | 1.2 | A5182 | 1.6 | 2 | 4.0 | 2 | A4043WY | 1.2 | 70 | 10 | 50 | 0.84 |
| 9 | 590 MPa* | 1.2 | A5182 | 3.0 | 3 | 4.0 | 1.3 | A5183WY | 1.2 | 90 | 14 | 70 | 1.08 |
| 10 | 590 MPa* | 1.2 | A5182 | 3.0 | 3 | 4.0 | 1.3 | A5183WY | 1.2 | 90 | 14 | 40 | 1.89 |
| 11 | 590 MPa* | 1.2 | A5182 | 3.0 | 3 | 4.0 | 1.3 | A5183WY | 1.2 | 110 | 15 | 50 | 1.98 |
| 12 | 590 MPa* | 1.2 | A5182 | 1.6 | 3 | 4.0 | 1.3 | A5554WY | 1.2 | 70 | 10 | 70 | 0.60 |
| 13 | 590 MPa* | 1.2 | A5182 | 1.6 | 3 | 4.0 | 1.3 | A5554WY | 1.2 | 70 | 10 | 50 | 0.84 |
| 14 | 590 MPaGA* | 1.2 | A5182 | 1.6 | 3 | 4.0 | 1.3 | A5356WY | 1.2 | 70 | 10 | 60 | 0.70 |
| 15 | 590 MPaGA* | 1.2 | A5182 | 1.6 | 3 | 4.0 | 1.3 | A5356WY | 1.2 | 70 | 10 | 50 | 0.84 |
| 16 | 590 MPa* | 2.0 | A5182 | 3.0 | 3 | 4.0 | 1.3 | A5183WY | 1.2 | 90 | 15 | 50 | 1.62 |
| 17 | 590 MPa* | 1.2 | A6061 | 3.0 | 3 | 4.0 | 1.3 | A5356WY | 1.2 | 90 | 15 | 60 | 1.35 |
| 18 | 270 MPa* | 1.2 | A5182 | 1.6 | 2 | 4.0 | 2 | A5183WY | 1.2 | 70 | 10 | 50 | 0.84 |
| 19 | 980 MPa* | 1.2 | A5182 | 1.6 | 3 | 4.0 | 1.3 | A5183WY | 1.2 | 70 | 10 | 50 | 0.84 |
| 20 | 590 MPa* | 1.2 | A5182 | 1.0 | 2 | 3.0 | 1.5 | A5183WY | 1.2 | 70 | 10 | 80 | 0.53 |

*High tensile strength steel

TABLE 3

| | Joining material | | | | Welding parameter | | | | Weld joint performance | |
|---|---|---|---|---|---|---|---|---|---|---|
| | Steel material | | Aluminum material | | | | | | | Tensile |
| Sample No. | Type | Thickness mm | Type | Thickness Ta mm | Tb/R | D/Ta | Ta/3.5 | Ta/1.4 | Bead cracking | strength MPa |
| 1 | 590 MPa* | 1.2 | A5182 | 1.6 | 0.85 | 0.15 | 0.46 | 1.14 | ⊚ | 113.7 |
| 2 | 590 MPa* | 1.2 | A5182 | 1.6 | 0.84 | 0.47 | 0.46 | 1.14 | ⊚ | 149.8 |
| 3 | 590 MPa* | 1.2 | A5182 | 1.6 | 0.85 | 0.71 | 0.46 | 1.14 | ⊚ | 152.4 |
| 4 | 590 MPa* | 1.2 | A5182 | 1.6 | 0.83 | 0.96 | 0.46 | 1.14 | ⊚ | 153.7 |
| 5 | 590 MPa* | 1.2 | A5182 | 1.6 | 0.53 | 1.42 | 0.46 | 1.14 | ⊚ | 106.0 |
| 6 | 590 MPa* | 1.2 | A5182 | 1.6 | 0.91 | 0.39 | 0.46 | 1.14 | ◯ | 94.5 |
| 7 | 590 MPa* | 1.2 | A5182 | 1.6 | 0.92 | 0.74 | 0.46 | 1.14 | ◯ | 101.2 |
| 8 | 590 MPa* | 1.2 | A5182 | 1.6 | 0.91 | 0.96 | 0.46 | 1.14 | ◯ | 97.8 |
| 9 | 590 MPa* | 1.2 | A5182 | 3.0 | 1.26 | 0.43 | 0.86 | 2.14 | ⊚ | 158.9 |
| 10 | 590 MPa* | 1.2 | A5182 | 3.0 | 1.27 | 0.67 | 0.86 | 2.14 | ⊚ | 165.6 |
| 11 | 590 MPa* | 1.2 | A5182 | 3.0 | 0.83 | 1.21 | 0.86 | 2.14 | ⊚ | 132.2 |
| 12 | 590 MPa* | 1.2 | A5182 | 1.6 | 0.80 | 0.51 | 0.46 | 1.14 | ⊚ | 123.9 |

TABLE 3-continued

| Sample No. | Joining material | | | | Welding parameter | | | | Weld joint performance | |
|---|---|---|---|---|---|---|---|---|---|---|
| | Steel material | | Aluminum material | | | | | | | Tensile strength MPa |
| | Type | Thickness mm | Type | Thickness Ta mm | Tb/R | D/Ta | Ta/3.5 | Ta/1.4 | Bead cracking | |
| 13 | 590 MPa* | 1.2 | A5182 | 1.6 | 0.81 | 0.93 | 0.46 | 1.14 | ◎ | 128.2 |
| 14 | 590 MPaGA* | 1.2 | A5182 | 1.6 | 0.74 | 0.67 | 0.46 | 1.14 | ◎ | 145.9 |
| 15 | 590 MPaGA* | 1.2 | A5182 | 1.6 | 0.76 | 0.91 | 0.46 | 1.14 | ◎ | 148.4 |
| 16 | 590 MPa* | 2.0 | A5182 | 3.0 | 1.22 | 0.56 | 0.86 | 2.14 | ◎ | 161.2 |
| 17 | 590 MPa* | 1.2 | A6061 | 3.0 | 1.18 | 0.49 | 0.86 | 2.14 | ◎ | 153.4 |
| 18 | 270 MPa* | 1.2 | A5182 | 1.6 | 0.86 | 0.94 | 0.46 | 1.14 | ◎ | 150.9 |
| 19 | 980 MPa* | 1.2 | A5182 | 1.6 | 0.85 | 0.98 | 0.46 | 1.14 | ◎ | 164.8 |
| 20 | 590 MPa* | 1.2 | A5182 | 1.0 | 0.93 | 0.62 | 0.29 | 0.71 | ◎ | 140.8 |

*High tensile strength steel
Ta: Aluminum sheet thickness,
Tb: Bead thickness,
D: Maximum melt-in depth,
R: Circle-equivalent

Example 3

The present inventors produced weld joints by joining steel sheets ("GA" in the column "Type" meant a hot-dip galvanized steel sheet) and aluminum sheets shown in Table 4 below under various heat input conditions through arc welding using a DC power source and various kinds of aluminum welding wires. In the steel sheets, round-shaped voids of the diameters (2R, R meant a circle-equivalent radius) shown in Table 4 were formed beforehand at the intervals (the lengths of the non-void portions) shown in Table 4. In the arc welding, an Ar gas (flow rate of 20 to 25 l./min.) was used as the shielding gas. The angle of the welding torch was set at 80°.

The produced weld joints were visually inspected to judge the existence of bead cracking and also the joint strength thereof was measured in the same manner as Example 2. The results are shown in Table 5.

As it is obvious from Tables 4 and 5, in the case of a DC power source, when the welding condition (heat input Q) satisfied the expression $Ta/1.5 \leq Q \leq Ta/0.7$ (Ta meant the thickness of an aluminum sheet), in every case, the value Tb/R was not less than 0.50 and the value D/Ta was not less than 0.10, and thus an excellent weld joint having an excellent joint strength of 90 MPa or higher and no bead cracking could be obtained.

TABLE 4

| Sample No. | Joining material | | | | Steel material void conditions | | | Welding wire | | Welding conditions | | | |
|---|---|---|---|---|---|---|---|---|---|---|---|---|---|
| | Steel material | | Aluminum material | | | | | | | | | Welding | |
| | Type | Thickness mm | Type | Thickness Ta mm | L-Fe | L-Al | P value | Type | Diameter mm | Electric current A | Voltage V | speed cm/min. | Heat input kJ/cm |
| 31 | 590 MPa* | 1.2 | A5182 | 1.6 | 3 | 4.0 | 1.3 | A5183WY | 1.2 | 70 | 16 | 40 | 1.68 |
| 32 | 590 MPa* | 1.2 | A5182 | 1.6 | 3 | 4.0 | 1.3 | A5183WY | 1.2 | 90 | 18 | 50 | 1.94 |
| 33 | 590 MPa* | 1.2 | A5182 | 1.6 | 3 | 4.0 | 1.3 | A5554WY | 1.2 | 100 | 19 | 80 | 1.43 |
| 34 | 590 MPa* | 1.2 | A5182 | 1.6 | 3 | 4.0 | 1.3 | A5554WY | 1.2 | 60 | 13 | 25 | 1.87 |
| 35 | 590 MPa* | 1.2 | A5182 | 1.0 | 3 | 4.0 | 1.3 | A5183WY | 1.2 | 100 | 18 | 120 | 0.90 |
| 36 | 590 MPa* | 1.2 | A5182 | 1.0 | 3 | 4.0 | 1.3 | A5183WY | 1.2 | 90 | 18 | 80 | 1.22 |
| 37 | 590 MPaGA* | 1.2 | A5182 | 1.6 | 4 | 4.0 | 1 | A5183WY | 1.2 | 70 | 14 | 30 | 1.96 |
| 38 | 590 MPaGA* | 1.2 | A5182 | 1.6 | 4 | 4.0 | 1 | A5183WY | 1.2 | 60 | 18 | 50 | 1.30 |
| 39 | 590 MPaGA* | 1.2 | A5182 | 1.6 | 4 | 4.0 | 1 | A5183WY | 1.2 | 135 | 14 | 50 | 2.27 |
| 40 | 270 MPa* | 1.2 | A5182 | 1.6 | 2 | 4.0 | 2 | A5183WY | 1.2 | 90 | 19 | 70 | 1.47 |
| 41 | 980 MPa* | 1.2 | A5182 | 1.6 | 2 | 4.0 | 2 | A5183WY | 1.2 | 60 | 18 | 30 | 2.16 |

*High tensile strength steel

TABLE 5

| | Joining material | | | | | | | | Weld Joint performance | |
|---|---|---|---|---|---|---|---|---|---|---|
| | Steel material | | Aluminum material | | | | | | | Tensile |
| Sample | | Thickness | | Thickness | Welding parameter | | | | Bead | strength |
| No. | Type | mm | Type | Ta mm | Tb/R | D/Ta | Ta/1.5 | Ta/0.7 | cracking | MPa |
| 31 | 590 MPa* | 1.2 | A5182 | 1.6 | 0.88 | 0.65 | 1.07 | 2.29 | ◉ | 153.2 |
| 32 | 590 MPa* | 1.2 | A5182 | 1.6 | 1.13 | 0.81 | 1.07 | 2.29 | ◉ | 168.3 |
| 33 | 590 MPa* | 1.2 | A5182 | 1.6 | 0.89 | 0.14 | 1.07 | 2.29 | ◉ | 91.7 |
| 34 | 590 MPa* | 1.2 | A5182 | 1.6 | 0.83 | 0.48 | 1.07 | 2.29 | ◉ | 122.9 |
| 35 | 590 MPa* | 1.2 | A5182 | 1.0 | 0.91 | 0.59 | 0.67 | 1.43 | ◉ | 139.4 |
| 36 | 590 MPa* | 1.2 | A5182 | 1.0 | 1.08 | 0.69 | 0.67 | 1.43 | ◉ | 151.6 |
| 37 | 590 MPaGA* | 1.2 | A5182 | 1.6 | 1.21 | 0.74 | 1.07 | 2.29 | ◉ | 161.4 |
| 38 | 590 MPaGA* | 1.2 | A5182 | 1.6 | 1.09 | 0.32 | 1.07 | 2.29 | ◉ | 98.2 |
| 39 | 590 MPaGA* | 1.2 | A5182 | 1.6 | 0.63 | 1.28 | 1.07 | 2.29 | ◉ | 104.6 |
| 40 | 270 MPa* | 1.2 | A5182 | 1.6 | 0.93 | 0.23 | 1.07 | 2.29 | ◉ | 93.5 |
| 41 | 980 MPa* | 1.2 | A5182 | 1.6 | 0.93 | 0.71 | 1.07 | 2.29 | ◉ | 142.7 |

*High tensile strength steel
Ta: Aluminum sheet thickness,
Tb: Bead thickness,
D: Maximum melt-in depth,
R: Circle-equivalent The present invention makes it possible to obtain a sound dissimilar material weld joint not only having a high strength, a high ductility and thus an excellent joint strength but also yielding no cracking. In addition, the present invention makes it possible to provide a joining method that makes use of arc welding, facilitates the welding procedure, and allows linear welding to be applied. As a consequence, the present invention is useful in the field of a dissimilar material weld joint formed by joining a steel material and an aluminum material.

What is claimed is:

1. A dissimilar material weld joint formed by joining an iron based material and an aluminum based material, wherein a surface of the iron based material engages a surface of the aluminum based material, the welding joint comprising:
   voids formed in said iron based material at a predetermined interval along a weld line, said voids extending from the surface of the iron based material that engages the surface of the aluminum based material to an opposite surface of the iron based material;
   a bead comprising an aluminum welding material weld joining said iron based and aluminum based materials, said bead having a predetermined length greater than said predetermined interval in the direction of the weld line, said bead being applied onto said surface of the aluminum based material and onto said opposite surface of the iron based material extending continuously over at least two of said voids; and
   aluminum welding material filling said at least two of said voids;
   wherein the minimum value of a ratio (L-Al)/(L-Fe) over the predetermined length of said bead in direction of the weld line is in the range from 0.5 to 7,
   where (L-Al) is the length of said aluminum welding material within said voids are filled, along said weld line; (L-Fe) is the length of said iron based material adjacent to the filled voids, along said weld line.

2. The dissimilar material weld joint according to claim 1, wherein:
   a lower end portion of the aluminum welding material filling said voids in the molten state is joined to the surface of said aluminum based material exposed at said voids, and the upper end portion thereof in the molten state is joined to said bead which is applied onto the opposite surface of said iron based material; and
   when the thickness of said aluminum based material is defined as Ta, the maximum melt-in depth to which said weld melts in said surface layer of said aluminum based material as D, the average thickness of said weld bead on said weld line as Tb, and the circle-equivalent radius of said voids as R, the value D/Ta is not less than 0.10 and the value Tb/R is not less than 0.50.

3. The dissimilar material weld joint according to claim 1, wherein said voids have a round shape or an elliptic shape.

4. The dissimilar material weld joint according to claim 1, wherein:
   said iron based material is a hot-dip galvanized steel sheet; and
   said aluminum welding material contains Mg by 2.0 to 6.0 mass %.

5. The dissimilar material weld joint according to claim 1, made by sequential steps comprising:
   forming said voids on said iron based material at the predetermined interval along the weld line; and
   joining said iron based material placed over said aluminum based material by arc welding with an aluminum welding wire to form the bead while filling said voids with the molten aluminum welding material.

6. The weld joint according to claim 5, wherein, when the quantity of heat input Q (kj/cm) in arc welding is defined by the following expression and the thickness of said aluminum based material is defined as Ta (mm), welding is applied so as to satisfy the expression Ta/3.5≦Q≦Ta/1.4; in the case of an AC power source, Q(kj/cm)=60 (s./min.)×Welding current (A)×Welding voltage (V)/Welding speed (cm/min.)/1,000.

7. The weld joint according to claim 5, wherein, when the quantity of heat input Q (kj/cm) in arc welding is defined by the following expression and the thickness of said aluminum based material is defined as Ta (mm), welding is applied so as to satisfy the expression Ta/1.5≦Q≦Ta/0.7; in the case of an DC power source, Q(kj/cm)=60 (s./min.)×Welding current (A)×Welding voltage (V)/Welding speed (cm/min.)/1,000.

8. The weld joint according to claim 5, wherein:

said iron based material is a hot-dip galvanized steel sheet; and said aluminum welding wire contains Mg by 2.0 to 6.0 mass %.

\* \* \* \* \*